United States Patent
Raj et al.

(10) Patent No.: US 11,120,583 B2
(45) Date of Patent: Sep. 14, 2021

(54) TOMOGRAPHIC IMAGING USING FAST STOCHASTIC HIERARCHICAL BAYESIAN SYSTEMS AND METHODS

(71) Applicant: The Government of the United States of America, as represented by the Secretary of the Navy, Arlington, VA (US)

(72) Inventors: Raghu G. Raj, Fairfax, VA (US); John Mckay, State College, PA (US); Vishal Monga, State College, PA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 35 days.

(21) Appl. No.: 16/667,473

(22) Filed: Oct. 29, 2019

(65) Prior Publication Data
US 2020/0134888 A1   Apr. 30, 2020

Related U.S. Application Data

(60) Provisional application No. 62/751,742, filed on Oct. 29, 2018.

(51) Int. Cl.
G06T 11/00 (2006.01)
(52) U.S. Cl.
CPC ....... *G06T 11/006* (2013.01); *G06T 2211/424* (2013.01)

(58) Field of Classification Search
CPC ................ G06T 11/006; G06T 2211/424
See application file for complete search history.

(56) References Cited

U.S. PATENT DOCUMENTS

2017/0109901 A1 *  4/2017  Raj ................ G06T 11/005

OTHER PUBLICATIONS

McKay J, Raj RG, Monga V, Fast Stochastic Hierarchical Bayesian Map for Tomographic Imaging, (Jul. 7, 2017), arXiv: 1707.02336v1. (Year: 2017).*
Raj RG, A hierarchical Bayesian-MAP approach to inverse problems in imaging, (2016), Inverse Problems, 1-20. (Year: 2016).*

* cited by examiner

*Primary Examiner* — Matthew C Bella
*Assistant Examiner* — Kathleen M Broughton
(74) *Attorney, Agent, or Firm* — US Naval Research Laboratory; William P. Ladd

(57) ABSTRACT

Systems and methods are provided for imaging that demonstrably outperform previous approaches (especially compressive sensing based approaches). Embodiments of the present disclosure provide and solve an imaging cost function via a stochastic approximation approach. By doing so, embodiments of the preset disclosure provide a significant means of generalization and flexibility to adapt to different application domains while being competitive in terms of computational complexity.

16 Claims, 9 Drawing Sheets

TOMOGRAPHIC IMAGING USING FAST STOCHASTIC HIERARCHICAL BAYESIAN SYSTEMS AND METHODS

CROSS REFERENCE TO RELATED APPLICATIONS

This application claims the benefit of U.S. Provisional Patent Application No. 62/751,742, filed on Oct. 29, 2018, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 107290-US3.

FIELD OF THE DISCLOSURE

This disclosure relates to imaging, including tomographic imaging.

BACKGROUND

A wide variety of analytical and statistical approaches have proliferated over the past several decades in diverse imaging applications, such as radar, medical, and astronomical imaging. Image recovery algorithms attempt to achieve the highest quality reconstruction in a timely manner. Robust and high-fidelity image reconstruction can be difficult, especially given a limited number of samples and in the presence of sensor noise. What is needed are systems and methods for imaging that take dramatically fewer operations while retaining high reconstruction quality.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 3:
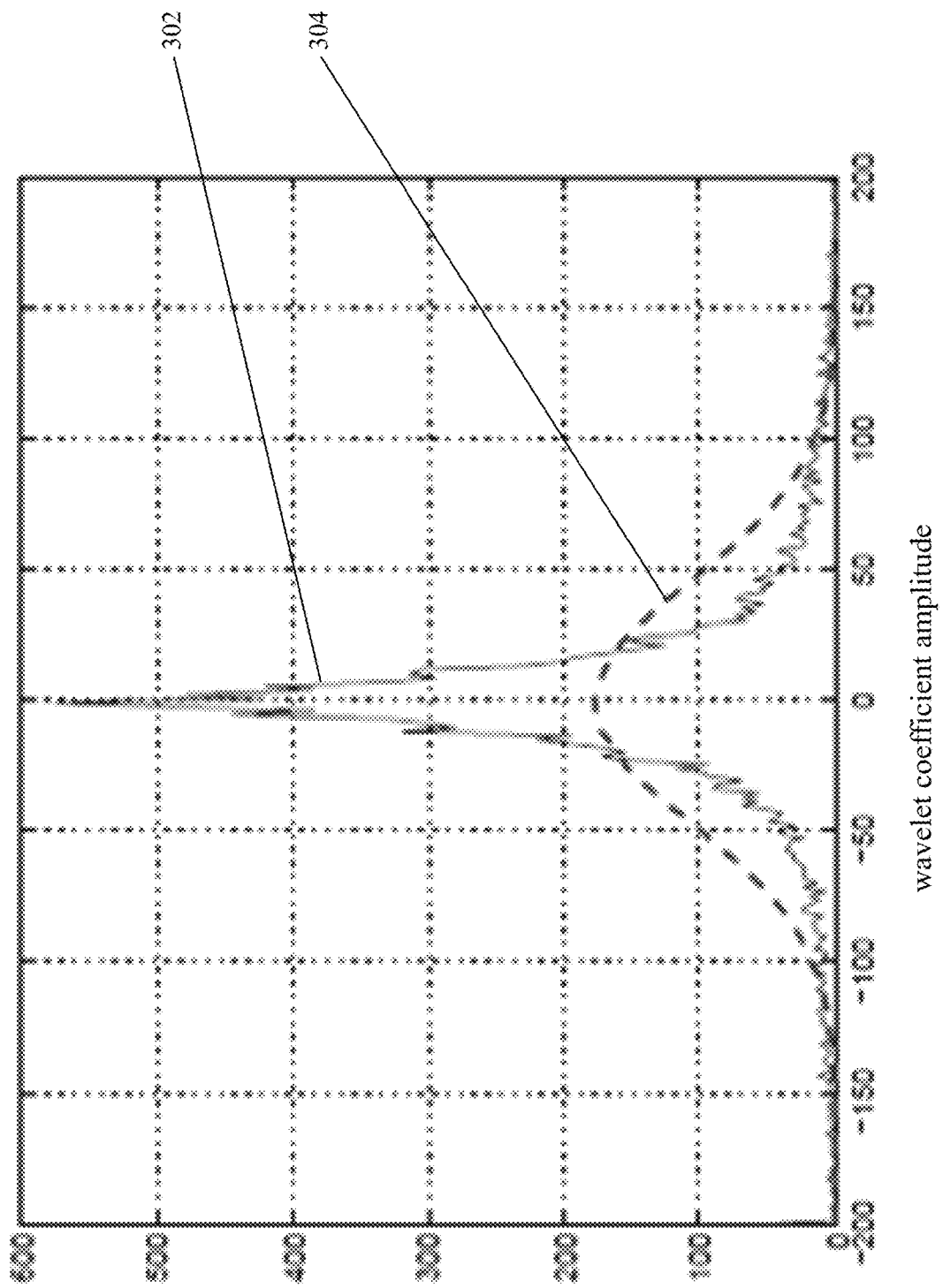
Figure 4:
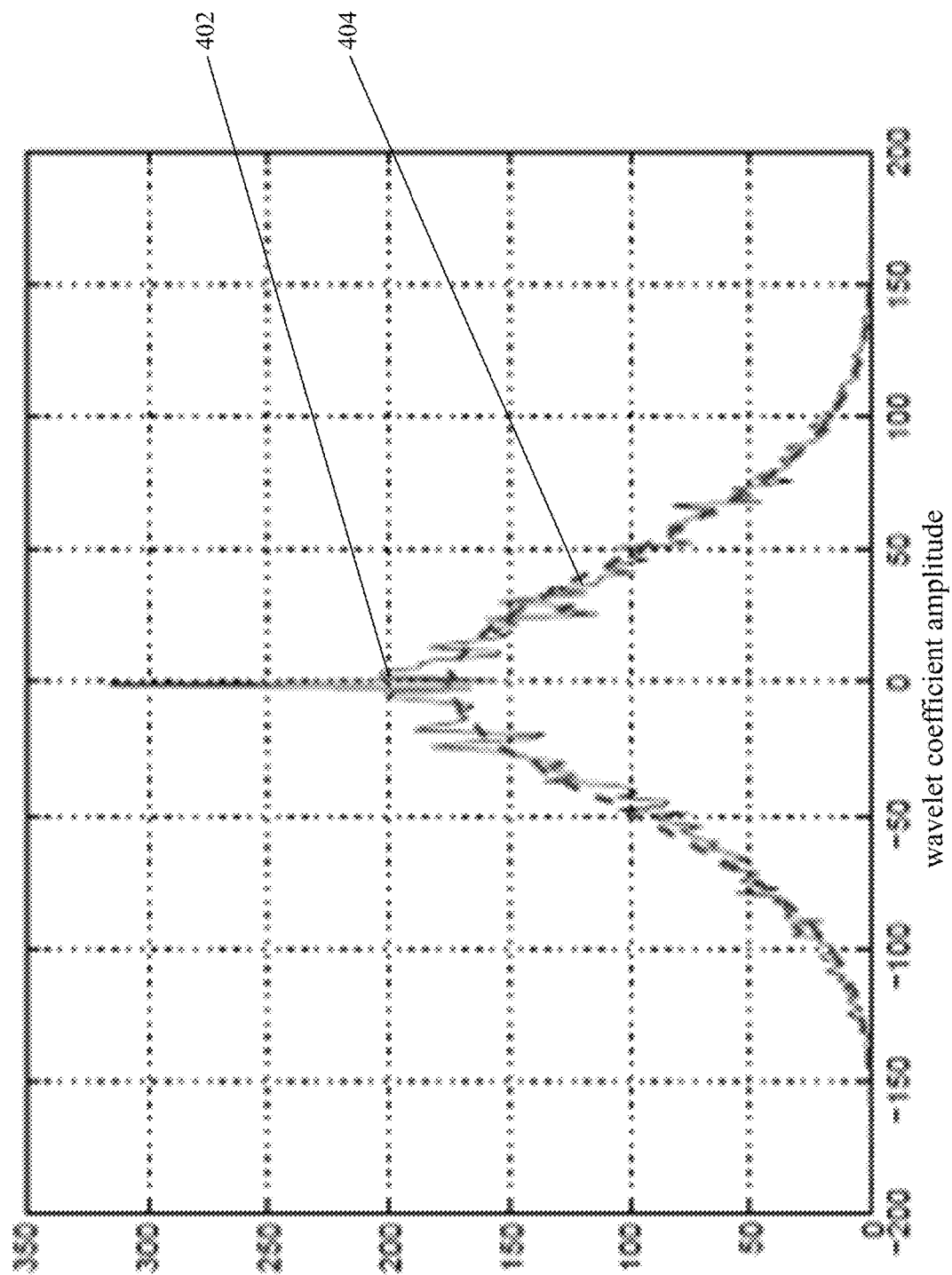
Figure 5:
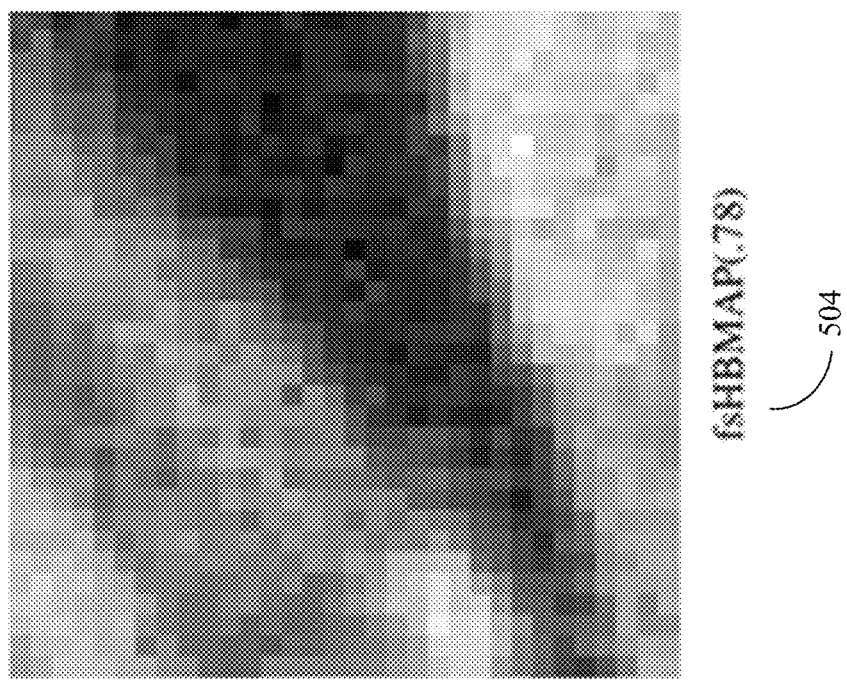
Figure 5:
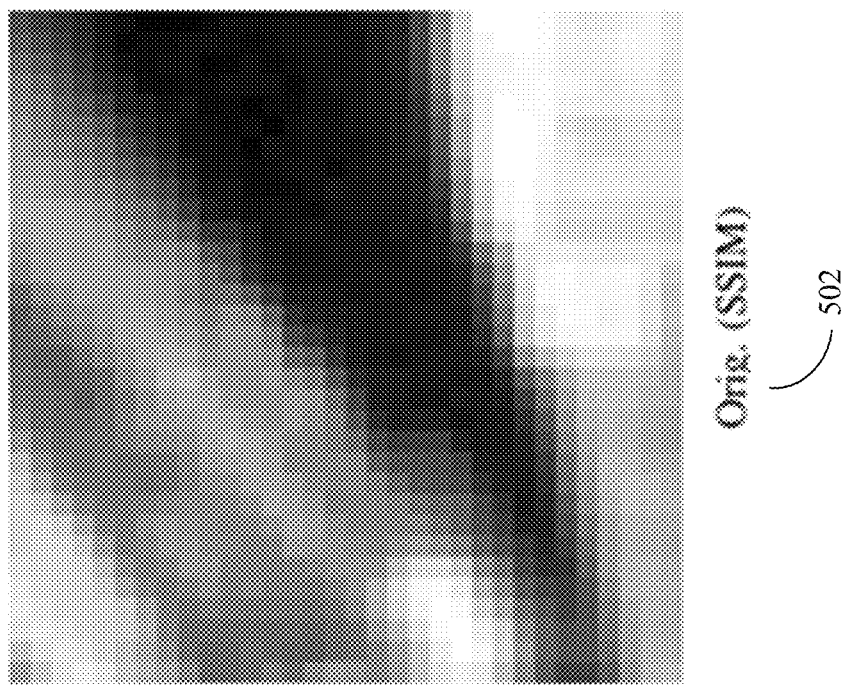
Figure 6:
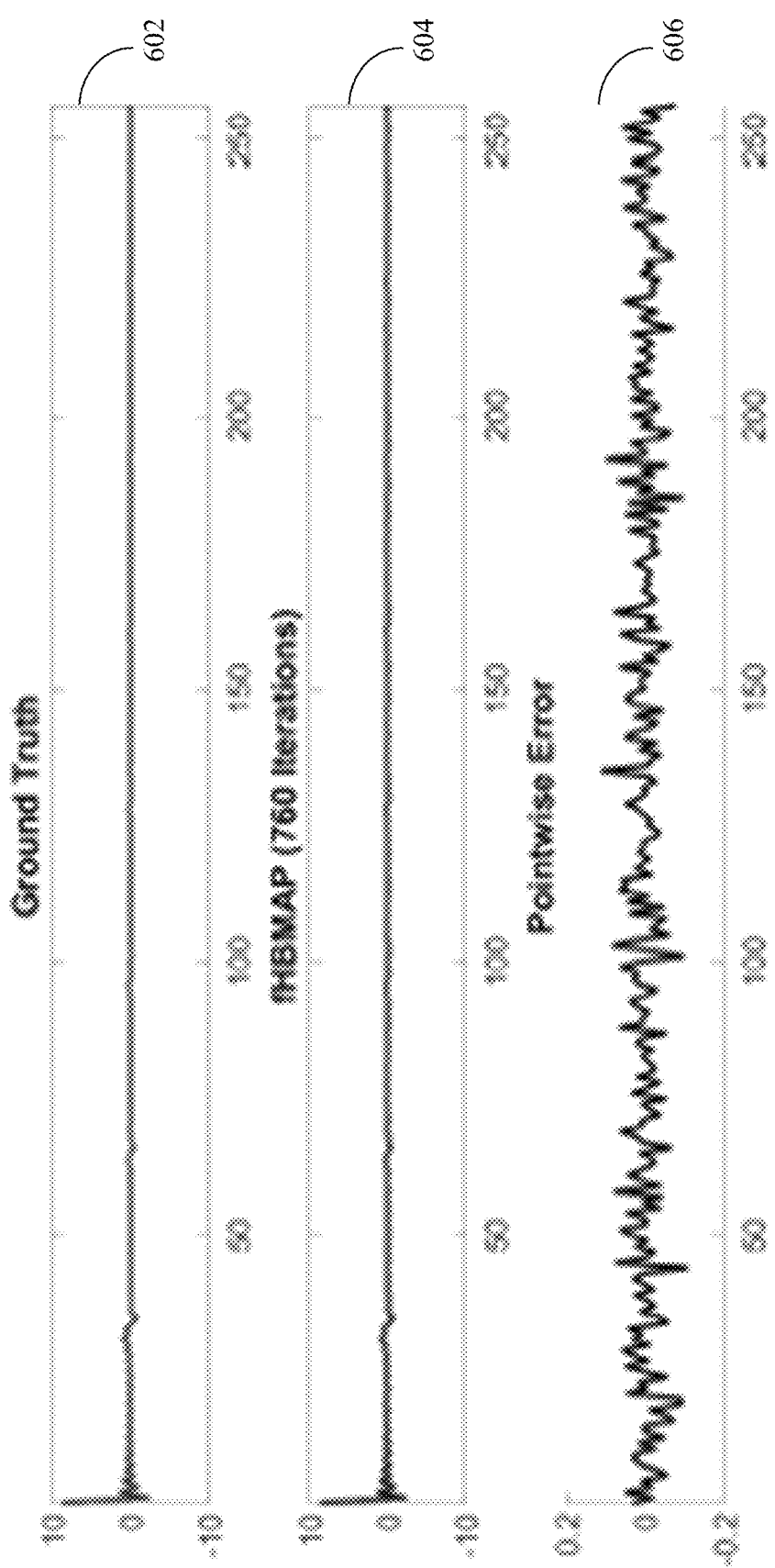
Figure 7:
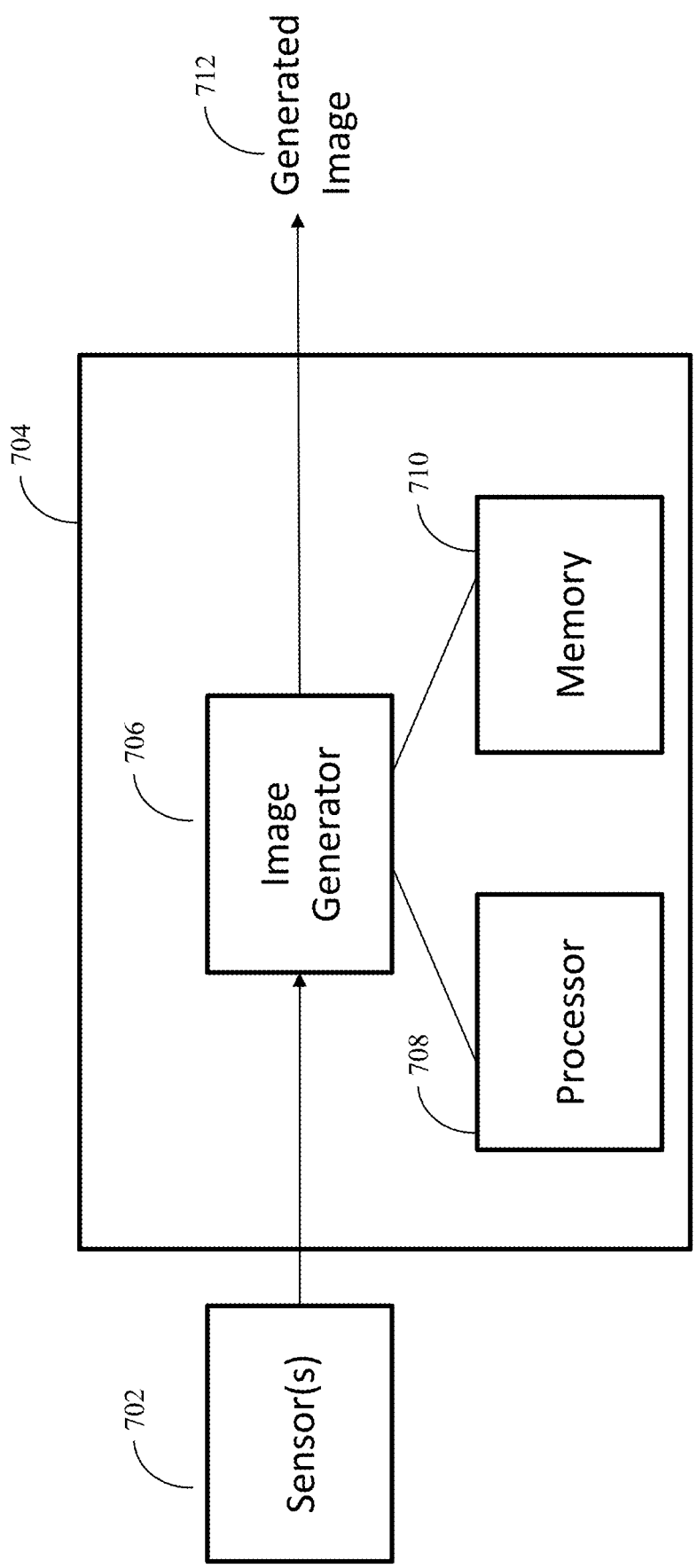
Figure 8:
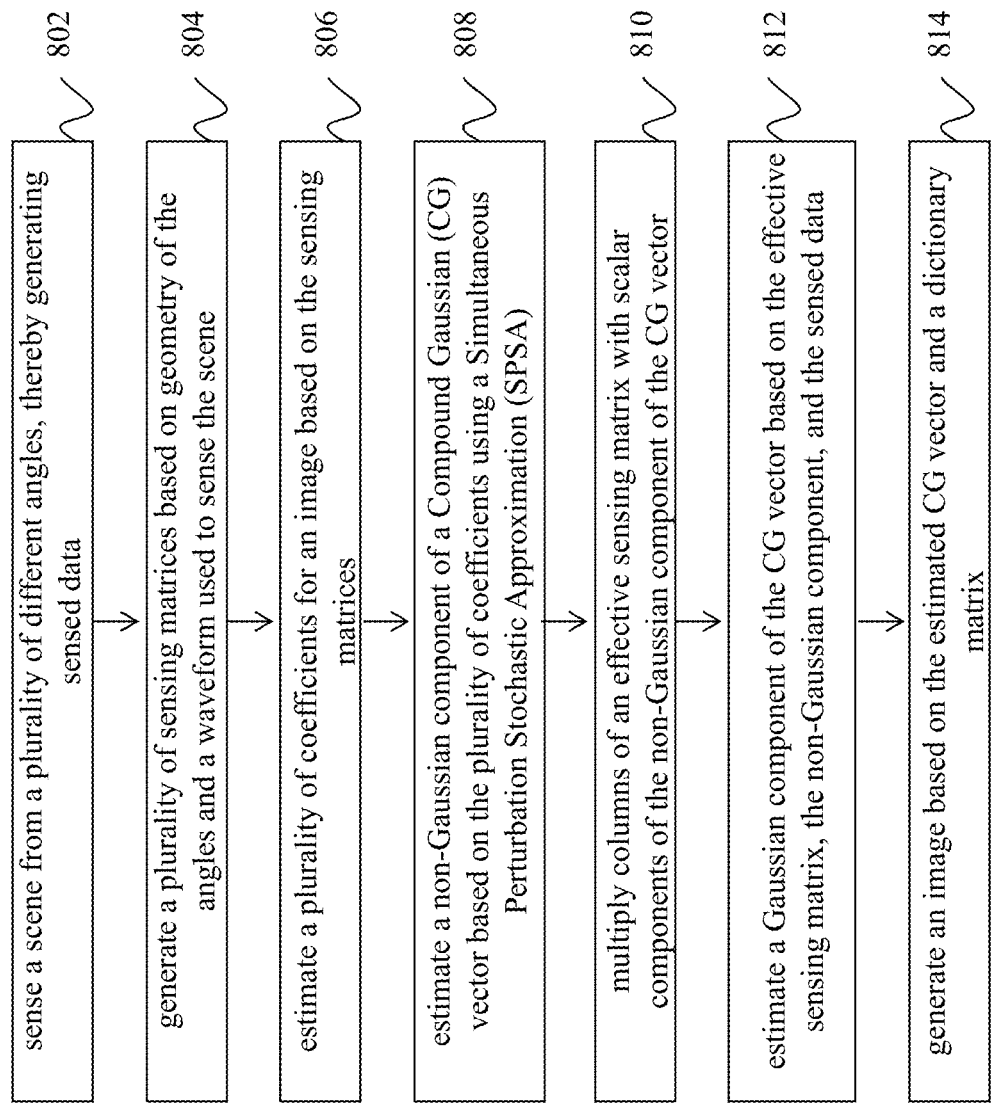
Figure 9:
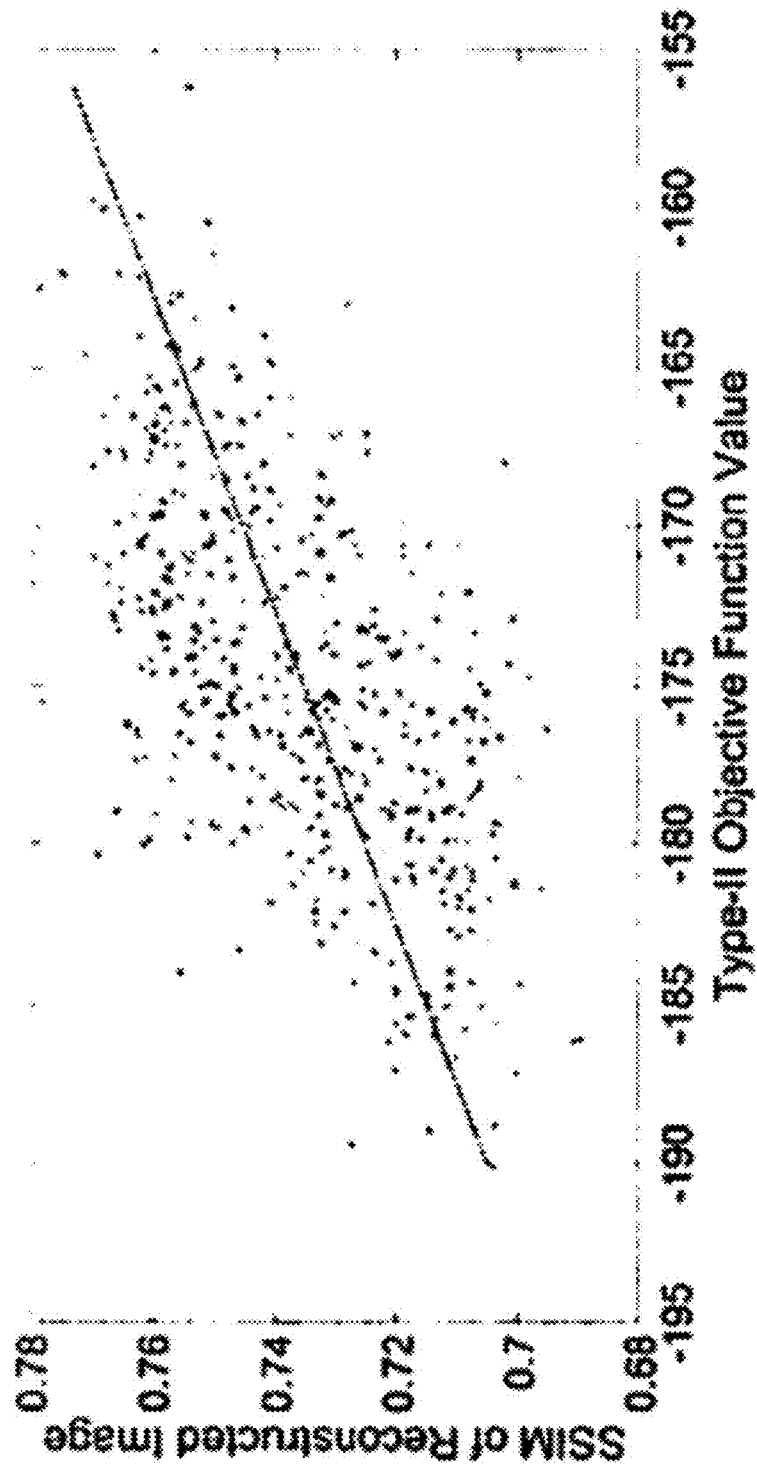

Stochastic Hierarchical Bayesian MAP (fsHBMAP) algorithm in accordance with an embodiment of the present disclosure;

FIG. 3 shows an exemplary plot of the histogram of coefficients for a typical synthetic-aperture radar (SAR) in accordance with an embodiment of the present disclosure;

FIG. 4 illustrates an exemplary variance-matched Compound Gaussian (CG) model in accordance with an embodiment of the present disclosure;

FIG. 5 illustrates an exemplary reconstruction of an image using a (fsHBMAP) technique in accordance with an embodiment of the present disclosure;

FIG. 6 shows exemplary plots of wavelet coefficients for ground truth fsHBMAP, and pointwise error in accordance with an embodiment of the present disclosure;

FIG. 7 is a diagram of an exemplary imaging system in accordance with an embodiment of the present disclosure;

FIG. 8 is a flowchart of an exemplary method for imaging in accordance with an embodiment of the present disclosure; and FIG. 9 is a diagram illustrating Type-II objective function value in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure provide systems and methods for imaging that demonstrably outperform previous approaches (especially compressive sensing based approaches). Embodiments of the present disclosure provide and solve an imaging cost function via a stochastic approximation approach. By doing so, embodiments of the present disclosure offer a significant means of generalization and flexibility to adapt to different application domains, while being competitive in terms of computational complexity.

For example, embodiments of the present disclosure systematically incorporate prior (probabilistic) knowledge of the scene structure into the inference process. Embodiments of the present disclosure use a robust statistical inference technique under sub-Nyquist sampling when there is degradation of the received signal due to corruptions arising from environmental and other factors.

Image recovery algorithms attempt to achieve the highest quality reconstruction in a timely manner. The former can be achieved in several ways, among which are by incorporating Bayesian priors that exploit natural image tendencies to cue in on relevant phenomena. The Hierarchical Bayesian Maximum a Posteriori (HB-MAP) is one such approach which produces compelling results albeit at a substantial computational cost. Embodiments of the present disclosure largely retain the imaging quality of HB-MAP while achieving an order of magnitude reduction in computational speed via the application of stochastic approximation techniques.

For example, embodiments of the present disclosure retain the proficient nature of Hierarchical Bayesian Maximum a Posteriori's (HB-MAP) Type-I estimation and use a stochastic approximation-based approach to Type-II estimation. The resulting algorithm, Fast Stochastic Hierarchical Bayesian MAP (fsHBMAP), takes dramatically fewer operations while retaining high reconstruction quality. Embodiments of the present disclosure employ a fsHBMAP scheme to the problem of tomographic imaging and demonstrate that fsHBMAP furnishes promising results when compared to many competing methods.

In an embodiment, an fsHBMAP algorithm is used to provide a vehicle to extend the capabilities of imaging algorithms to include truly global priors. Probabilistic graphical models can yield state-of-the-art performance for signal classification problems. Embodiments of the present disclosure deploy CG based probabilistic graphical models for the purposes of regression to obtain state-of-the-art results. The formulation and fsHBMAP algorithm used by embodiments of the present disclosure can be applied to a variety of sampling matrices and can thus be potentially applied to a wide range of inverse problems beyond imaging.

2. Scene Estimation

The act of obtaining images from tomographic settings has been a long studied problem with applications ranging from radar to magnetic resonance imaging. However the signaling apparatus is constructed, there is a consistent theme: a plane/volume is captured by rays of directed waves that are recorded, match filtered, and processed to achieve the pixels of the image. Several aspects to this procedure have emerged as especially difficult, none the least of which is limited sampling. For example, one problem is obtaining a quality image if a tomographic set-up can collect only a dearth of jittered data points.

Figure 1:
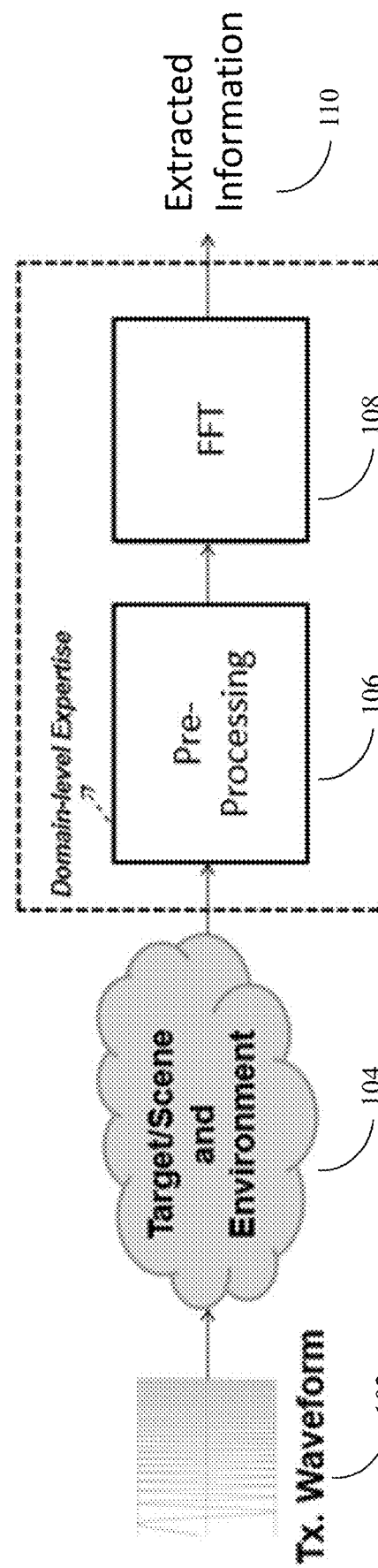
FIG. 1 is a diagram of an exemplary approach to scene estimation.

FIG. 1 is a diagram of an exemplary approach to scene estimation. In FIG. 1, a transmitted waveform 102 is used to sense scene and environment 104. Using sensed information from scene and environment 104, pre-processing 106 can be performed (e.g., using domain-level expertise, such as range migration, motion compensation in radar signal processing, etc.). Next, a Fast Fourier Transform (FFT) 108 can be performed for spectral analysis. Embodiments of the present disclosure replace the FFT step 108 with a Fast Stochastic Hierarchical Bayesian MAP (fsHBMAP) algorithm, as will be discussed below.

3. Exemplary fsHBMAP Approach

Generally, a received signal is equal to the generalized Radon transform of an image plus noise. An unknown image (I) can be represented, in terms of basis functions, as $I=\Phi c$, where $\Phi \in \mathbb{R}^{p \times n}$ is the Dictionary matrix in which the image is represented (e.g., for Wavelets etc.). In an embodiment, $\Phi$ can be chosen to be the Wavelet dictionary, and, given this, the only unknown quantities to be estimated are the coefficients $c \in \mathbb{R}^n$. However, it should be understood that $\Phi$ is not limited to wavelets in accordance with embodiments of the present disclosure.

Figure 2:
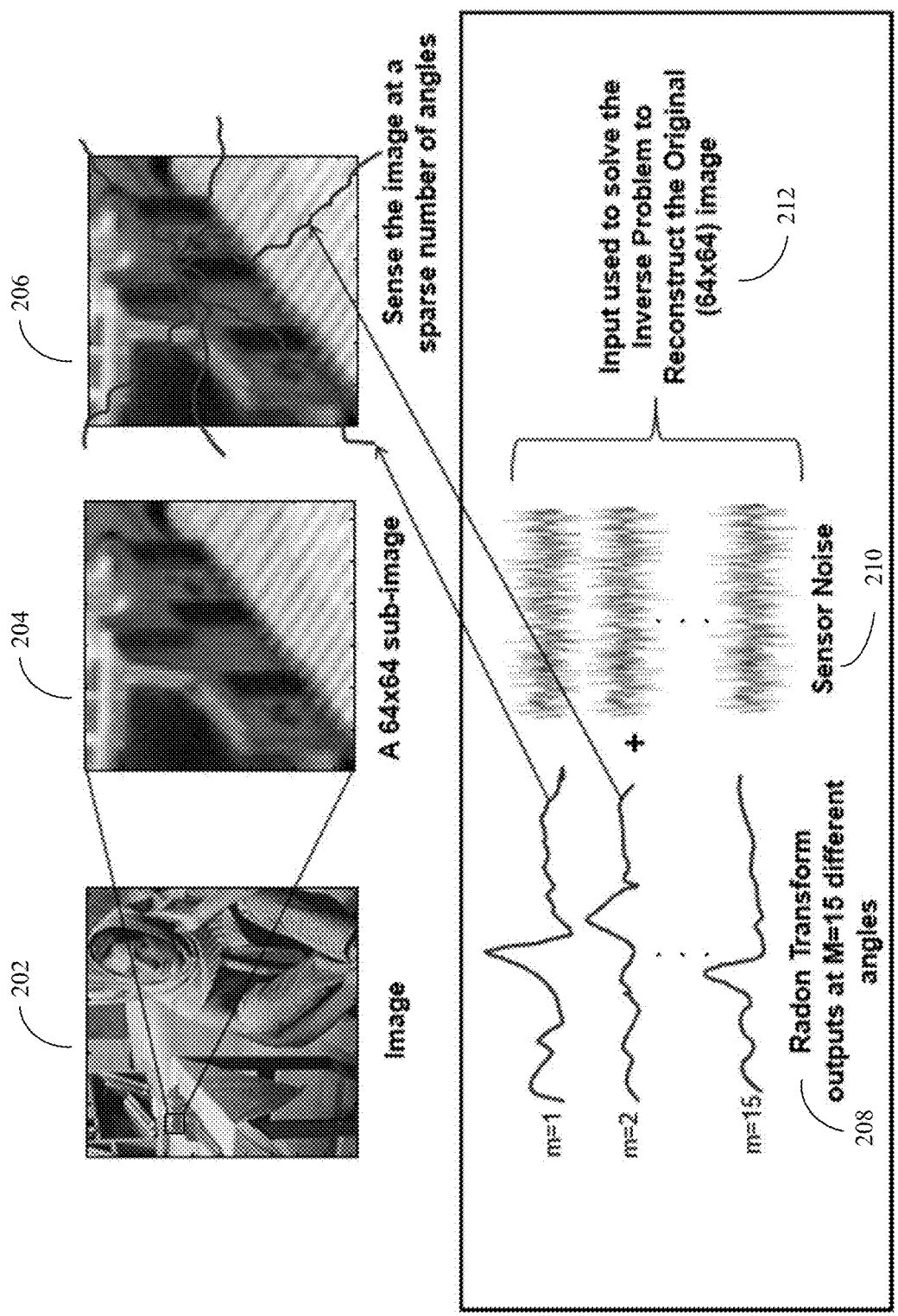
FIG. 2 illustrates how exemplary inputs are generated for an exemplary Fast

FIG. 2 illustrates how exemplary inputs are generated for an exemplary fsHBMAP algorithm in accordance with an embodiment of the present disclosure. In FIG. 2, an original image 202 of a woman is shown. A 64×64 sub-image 204 is used as an example input for the fsHBMAP algorithm. Embodiments of the present disclosure sense this sub-image 204 and attempt to reconstruct it. For example, in FIG. 2, sub-image 204 is sensed at a variety of different angles, as shown by image 206. In an embodiment, based on the sensor outputs at these different angles, a plurality of Radon transform outputs are generated. In an embodiment, using the Radon transform, sub-image 204 can be re-created from projection data from cross-sectional scans of sub-image 204 (illustrated by image 206). FIG. 2 shows Radon transform outputs 208 at 15 different angles. In an embodiment, these Radon transform outputs 208 and sensor noise 210 are used as inputs 212 to the fsHBMAP algorithm for reconstructing sub-image 204. In an embodiment, inputs 212 can be pre-processed 106 before an fsHBMAP algorithm is applied to reconstruct sub-image 204. It should be understood that fsHBMAP algorithms in accordance with embodiments of the present disclosure are not limited to the generalized Radon transform and can in principle be applied to a wider class of sensing matrices.

Given the inputs discussed above with reference to FIG. 2, a mathematical model for an imaging system in accordance with an embodiment of the present disclosure can be represented by the equation $y=\psi I+v=\psi \Phi c+v$, where $y \in \mathbb{R}^m$ is the measured signal (e.g., after pre-processing 106), $\psi \in \mathbb{R}^{m \times p}$ is the effective sensing matrix (e.g., for a general Radon transform), $\Phi \in \mathbb{R}^{p \times n}$ is the Dictionary matrix in which the image (e.g., sub-image 204) is represented (Wavelets, Fourier, etc.), $c \in \mathbb{R}^n$ represents the underlying coefficients to be estimated (the resulting image estimate is $I=\Phi c$), and $v \in \mathbb{R}^n$ is the interference in the measurements due to both clutter and noise. In an embodiment, $\Phi$ can be chosen to be the Wavelet dictionary, and, given this, the only unknown quantities to be estimated are the coefficients $c \in \mathbb{R}^n$.

In an embodiment, based on the above, the wavelet coefficients of an image (e.g., sub-image 206) can be calculated. FIG. 3 shows an exemplary plot of the histogram of coefficients $c \in \mathbb{R}^n$ for a typical synthetic-aperture radar (SAR) in accordance with an embodiment of the present disclosure. In FIG. 3, plot 302 shows a histogram of wavelet coefficients c, and plot 304 shows a best variance-marched Gaussian for plot 302.

In an embodiment, the Compound Gaussian (CG) Model of c can be represented by $c=z \odot u$, where $u \sim N(0, \sigma_u)$ is a Gaussian random vector, and $z \geq 0$ is a Non-Gaussian random vector. In an embodiment, vector z can be estimated (given c in this case), and vector c can be normalized ($u(i)=c(i)/z(i)$ for each vector component i). Next, in an embodiment, the histogram of u and its best Gaussian match can be plotted. FIG. 4 illustrates an exemplary variance-matched Compound Gaussian (CG) model in accordance with an embodiment of the present disclosure. In FIG. 4, plot 402 shows histogram of u, and plot 404 shows a best variance-matched CG for plot 402. This underlying phenomenon is exploited by embodiments of the present disclosure.

In an embodiment, Simultaneous Perturbation Stochastic Approximation (SPSA) approach can be used for stochastic approximation. In an embodiment, SPSA (and related approaches such as Finite Difference SA (FDSA)) starts with finite difference approximations (e.g., of the gradient) and incorporates probabilistic theories to reduce computations. Embodiments of the present disclosure can drastically speed up the estimation of the non-Gaussian component (i.e., the z-component) via the application of SPSA.

FIG. 5 illustrates an exemplary reconstruction of an image using a fsHBMAP technique in accordance with an embodiment of the present disclosure. In FIG. 5, an original image 502 and a fsHBMAP reconstruction 504 of the image 502 are shown. FIG. 6 shows exemplary plots of wavelet coefficients for ground truth 602, fsHBMAP 604, and pointwise error 606 in accordance with an embodiment of the present disclosure. In an embodiment, fsHBMAP is much more amenable to being applied to large scale imaging problems because, unlike other approaches, no explicit gradient or Kronecker calculations are involved.

4. Exemplary Systems

While fsHBMAP techniques are discussed above with reference to image reconstruction, it should be understood that fsHBMAP techniques can be used to generate original image(s) based on information from sensors. For example, in an embodiment, a scene/environment can be sensed from a variety of different angles (e.g., using sensors on board a ship, such as radar, synthetic-aperture radar (SAR), etc.), and fsHBMAP techniques can be used to generate an original image based on information from these sensors.

FIG. 7 is a diagram of an exemplary imaging system in accordance with an embodiment of the present disclosure. In FIG. 7, sensor(s) 702 (e.g., sensors on board a ship, such as SAR sensors sense a scene (e.g., an underwater environment) from a plurality of angles, thereby generating sensed data. In an embodiment, sensors 702 send sensed information to imaging device 704. In an embodiment, imaging device 704 includes an image generator 706, a processor 708, and a memory 710. In an embodiment, processor 708 and/or memory 710 are not located within imaging device 704 but are accessible by imaging device 704. In an embodiment, image generator 706 (or, in an embodiment, sensor(s) 702) perform pre-processing on data from the sensed scene (e.g., using domain-level expertise, such as range migration, motion compensation etc.).

In an embodiment, image generator 706 (or, in an embodiment, sensor(s) 702) generates a plurality of sensing matrices (e.g., in an embodiment, using a Radon transform) based on based on geometry of the sensing angles and the sensor waveform used to sense the scene. In an embodiment, image generator 706 estimates a plurality of coefficients for an image based on the sensing matrices. In an embodiment, image generator 706 estimates a Compound Gaussian (CG) vector based on the plurality of coefficients using a Simultaneous Perturbation Stochastic Approximation (SPSA) and generates an image 712 based on the estimated CG vector.

In an embodiment, a Compound Gaussian (CG) model c of the coefficients can be represented by the equation c=z⊙u, where z is the non-Gaussian component and u is the Gaussian component. Thus, in an embodiment, both the Gaussian component u and the non-Gaussian component z are estimated to generate an estimated CG model c of the coefficients.

For example, in an embodiment, image generator 706 estimates a non-Gaussian component z of a Compound Gaussian (CG) vector c based on the plurality of coefficients using a Simultaneous Perturbation Stochastic Approximation (SPSA). In an embodiment, image generator 706 multiplies columns of an effective sensing matrix with scalar components of the non-Gaussian component z of the CG vector c. For example, in an embodiment, an effective sensing matrix is generated from the matrix product of the sensing matrix and a Dictionary matrix. As discussed above, the sensing matrix can be generated based on a Radon transform, and Φ can be chosen to be the Wavelet dictionary.

In an embodiment, image generator 706 estimates a Gaussian component u of the CG vector c based on the normalized effective sensing matrix (e.g., after it was multipled), and the sensed data. In an embodiment, image generator 706 estimates a best Gaussian component u of the CG vector c. For example, in an embodiment, the best Gaussian component u is selected as the least square estimate of the Gaussian component of the CG vector c. In an embodiment, image generator 706 can then generate the image 712 based on the estimated CG vector c and a dictionary matrix.

Imaging device 704 and/or image generator 706 can be implemented using hardware, software, and/or a combination of hardware or software. Imaging device 704 and/or image generator 706 can be implemented using a single device or using multiple devices. Imaging device 704 and/or image generator 706 can be implemented as standalone (special-purpose) devices or can be integrated into a host device. In an embodiment, sensor(s) 702 can be integrated into imaging device 704. In an embodiment, sensor(s) 702 can be integrated into image generator 706. In an embodiment, image generator 706 is configured to receive data from a source other than sensor(s) 702. For example, in an embodiment, image generator 706 can be configured to receive data for image processing from a computer, from a network (e.g., the Internet), from a wireless link (e.g., Bluetooth), or from any other source.

5. Exemplary Methods

FIG. 8 is a flowchart of an exemplary method for imaging in accordance with an embodiment of the present disclosure. In step 802, a scene is sensed from a plurality of different angles, thereby generating sensed data. For example, in an embodiment, sensor(s) 702 sense data from the surrounding environment (e.g., using SAR). In step 804, a plurality of sensing matrices (e.g., using a Radon transform) are generated (e.g., by image generator 706 or sensor(s) 702) based on geometry of the angles and a waveform used to sense the scene. In step 806, a plurality of coefficients are estimated for an image (e.g., by image generator 706) based on the sensing matrices.

In step 808, a non-Gaussian component of a Compound Gaussian (CG) vector is estimated (e.g., by image generator 706) based on the plurality of coefficients using a Simultaneous Perturbation Stochastic Approximation (SPSA). In step 810, columns of an effective sensing matrix are multiplied (e.g., by image generator 706) with scalar components of the non-Gaussian component of the CG vector. In step 812 a Gaussian component of the CG vector is estimated (e.g., by image generator 706) based on the effective sensing matrix, the non-Gaussian component, and the sensed data. In step 814, an image is generated (e.g., by image generator 706) based on the estimated CG vector and a dictionary matrix.

6. Exemplary HB-MAP Algorithm

Exemplary algorithms for HB-MAP and fsHBMAP will now be discussed in greater detail. Of the different manners in which to handle such a situation, the Hierarchical Bayesian Maximum a Posteriori (HB-MAP) approach has yielded compelling results on optical images with the express intent of usage for, but not limited to, tomography. However this method has a significant drawback—it is computationally expensive. Its detailed structure involves a complicated objective function which requires nontrivial computational cost, restricting its applicability to large-scale inverse problems. A brief overview of an exemplary HB-MAP algorithm will now be discussed.

In an embodiment, the following linear model can be considered for reconstructing images, which finds powerful applications in imaging and compressive sensing: $y=X\beta+\varepsilon$, where y is a vector of received measurements, X is a dictionary containing some basis, whether it be wavelet, Fourier, or similar, $\beta$ is the coefficient vector we look to find, and $\varepsilon$ is Gaussian white noise. In an embodiment, we presume $y, \beta, \varepsilon \in \mathbb{R}^n$ and $X \in \mathbb{R}^{n \times n}$. There is no shortage in ways to solve for $\beta$ given the assumption of the above linear model, and many involve a prior being placed on this coefficient term either explicitly or implicitly via the inclusion of a penalty function. In this way, it can be further interpreted as solving Equation (1) below:

$$\underset{\beta \in F^n}{\arg\max} \log P(\beta \mid y) = \underset{\beta \in F^n}{\arg\max} \; y - X\beta_2^2 - \log P(\beta) \quad (1)$$

In an embodiment, a good choice for the prior on $\beta$ for this distribution is the Laplacian, i.e., $\log P(\beta) \propto -\beta_1$, which can be interpreted as a relaxation of sparsity-enforcing to pseudo norm penalty. This choice for $\beta$ lacks proper sophistication in order to capture certain natural phenomena and, in an embodiment, is where the HB-MAP comes into play. First, let us revisit a linear model construction. In an embodiment, for HB-MAP, X can be thought of as the product of two quantities: a measurement matrix $\psi$ (e.g., a sensing matrix) and a dictionary $\Phi$. In an embodiment, with $X=\psi\Phi$, $\beta$ is a coefficient vector (with the true image being $\Phi\beta$). This grants the flexibility to further incorporate convenient linear transformation spaces (typically, but not restricted to, wavelet) concerning the image I. In an embodiment, $\psi$ could hold the information regarding the arrangement of sensors and readings, primarily in the mold of a Radon transform matrix in the tomographic setting, and $\Phi$ a wavelet dictionary such that $\Phi\beta$ is the optical image to be recovered. In an embodiment, a Compound Gaussian (CG) can be a suitable prior for $\beta$ since it is now the wavelet coefficients of a natural image. In an embodiment, $\beta$ can be shown by Equation (2) below:

$$\beta = u \odot z \text{ where } u \sim \mathcal{N}(0, \Sigma_u) \text{ and } z = h(x) \quad (2)$$

In Equation (2), x follows some mutli-scale Gaussian tree structure, and $h(\cdot)$ is an entry-wise, usually nonlinear function. In an embodiment, this construction leads to a two stage solution starting with a calculation for z (Type-II estimation), followed by a scheme for u (Type-I estimation). In an embodiment, the Type-II estimation involves substantial computations. In an embodiment, the issues arise from x; we can state y as shown by Equation (3) below:

$$y = X(h(x) \odot u) + \varepsilon \quad (3)$$

In an embodiment, optimizing z is the same as optimizing x as the input to the nonlinear h. In an embodiment, Type-II estimation, due to the multiscale Gaussian hierarchical Bayesian structure imposed on x, comes down to solving Equations (4) and (5) below given $H(x)=\text{diag}(h(x))$:

$$\underset{x \in \mathbb{R}^n}{\arg\max} \; y^T B(x)^{-1} y + \log\det B(x) + x^T \sum_x^{-1} x \quad (4)$$

$$B(x) = XH(x) \sum_u H(x) X^T + \sum_\varepsilon \quad (5)$$

In an embodiment, this objective function, which we will define as f(x), has what could be described as a particularly nasty gradient in terms of computational efficiency. Even with a "nice" choice for h (in terms analytical properties such as differentiability), the gradient can require costly Kronecker products, which are unavoidable without severe modification. Embodiments of the present disclosure can circumvent the calculation of an unseemly $\nabla_x f$ and an even more complex $\nabla_x^2 f$.

For example, assuming that an optimal x* is obtained, Type-I estimation can build off of this to calculate u. In an embodiment, this in turn is much simpler, as shown by Equation (6) below:

$$u^* = \underset{u \in F^n}{\arg\max} \log P(y \mid u) + \log P(u) \quad (6)$$

$$= \underset{u \in F^n}{\arg\min} (y - XH(x^*)u)^T \sum_\varepsilon^{-1} (y - XH(x^*)u) +$$

$$u^T \sum_u^{-1} u$$

In an embodiment, for $\Lambda = \text{diag}(z^*)$, Equation (6) leads to Equation (7) below:

$$\Lambda(X^T \Sigma_\varepsilon^{-1} X + \Lambda^{-1} \Sigma_u \Lambda^{-1}) \Lambda u = \Lambda X^T \Sigma_\varepsilon^{-1} y \quad (7)$$

In an embodiment, since this computation for u can be nontrivial in the manner given by (7), a strategy can be employed to reduce the load by defining $\Lambda_\tau$ as shown by Equation (8) below:

$$\Lambda_\tau = \text{diag}(c) \text{ where } c_i = \begin{cases} 1, & z_i^* > \tau \\ 0, & \text{else} \end{cases} \quad (8)$$

In an embodiment, based on the above, u can be found using Equation (9) below:

$$\Lambda_\tau (X^T \Sigma_\varepsilon^{-1} X + \Lambda^{-1} \Sigma_u \Lambda^{-1}) \Lambda_\tau u = \Lambda X^T \Sigma_\varepsilon^{-1} y \quad (9)$$

In an embodiment, with both $z=h(x^*)$ and u, one can quickly find $\beta$ using Equation (2), completing the two step process.

7. Exemplary fsHBMAP Algorithm

Embodiments of the present disclosure provide a modified HB-MAP algorithm—a fast stochastic HB-MAP (fsHB-MAP), using a stochastic approximation approach, for solving a problematic objective function. An exemplary fsHB-MAP algorithm in accordance with an embodiment of the present disclosure will now be discussed with reference to the HP-MAP algorithm discussed above.

In an embodiment, in Equation (7), if no simplifying substitutions regarding $\Lambda$ are made, we the problem can be reduced to Equation (10) below:

$$\left(\frac{1}{\sigma_\epsilon^2} X^T X + \frac{1}{\sigma_u^2} \Lambda^{-2}\right) \Lambda u = \frac{1}{\sigma_\epsilon^2} X^T y \qquad (10)$$

In Equation (10), $\Sigma_\epsilon = \sigma_\epsilon^2 I$, and $\Sigma_u = \sigma_u^2 I$. Notice that, in Equations (11) and (12):

$$\Lambda u = z \odot u = \beta \qquad (11)$$

$$\Rightarrow \beta = \frac{1}{\sigma_\epsilon^2} \left(\frac{1}{\sigma_z^2} X^T X + \frac{1}{\sigma_u^2} \Lambda^{-2}\right)^{-1} X^T y \qquad (12)$$

In an embodiment, the optimality of β hinges on the assumed optimality of x* (i.e., where h(x*) constitutes the diagonal of Λ. In an embodiment, a suboptimal x can be used as the input to h. In an embodiment, if the value of $\sigma_\epsilon^2$ is known, or, more likely, estimated well, then $\tilde{\beta}$ the coefficient vector corresponding to the solution of Equation (12) using a suboptimal x, can perform non-trivially.

FIG. 9 is a diagram illustrating Type-II objective function value in accordance with an embodiment of the present disclosure. As illustrated by FIG. 9, in an embodiment, 1000 image reconstructions of a 16×16 snippet of an image were conducted in the form of an inverse Radon transform with added noise (the noise was $\sigma_\epsilon^2 = 0.1$, and a wavelet dictionary was used). In each case, a vector composed of uniformly random values within (0, 1) made up x, and no refinement was made. This procedure yielded SSIM metrics with a mean of 0.73 and entirely within the range of (0.68, 0.78).

In an embodiment, given this aspect of HB-MAP, the question then becomes what influence the Type-II estimation has over the algorithm's output. Referencing FIG. 9, the trend line points to the fact that maximized values for f lead to better images. Thus, given any starting point, it appears useful to try to transition towards higher Type-II objective function values.

As mentioned above, Type-II estimation involves a prohibitively costly gradient calculation (to say nothing of its Hessian). Embodiments of the present disclosure provide an approximation $\tilde{f}$ that is much more efficient and still impressively capable. To start, let us break up f, as shown by Equation (13):

$$f(x) = \underbrace{y^T B(x)^{-1} y}_{f_1(x)} + \underbrace{\log \det B(x)}_{f_2(x)} + \underbrace{x^T \sum^{-1} x}_{f_3(x)} \qquad (13)$$

As can be seen by inspection, $f_3$ represents a more normal-looking objective function. In an embodiment, key technical issues revolve around ameliorating the numerical tractability of $f_1$ and $f_2$ given their role in B(x) as defined in Equation (5). Regarding B(x), the non-linear choice of h can be used, as shown by Equation (14):

$$h(x) = \left[\sqrt{\exp\left(\frac{x_1}{a}\right)} \quad \cdots \quad \sqrt{\exp\left(\frac{x_u}{a}\right)}\right]^T \qquad (14)$$

In Equation (14), $a \in \mathbb{R}$ (note that a framework in accordance with embodiments of the present disclosure can use a general choice for both). Substituting this and our other assumptions for the matrices $\Sigma_u$ and $\Sigma_\epsilon$ into Equation (5) yields Equation (15) below:

$$B(x) = \sigma_u^2 X^T H^2(x) X + \sigma_\epsilon^2 I \qquad (15)$$

In an embodiment, a slightly simplified B(x) is introduced, and a formal choice for H is performed for $f_2$. In an embodiment, two more assumptions are made: ψ is square and full rank. The proceeding theory and experimental work provides a strong basis for these assumptions. By the Minkowski inequality, as shown by Equation (16):

$$\det(B(x)) = \det(\sigma_u^2 X^T H^2(x) X + \sigma_\epsilon^2 I) \geq \det(\sigma_u^2 X^T H^2(x) X) + \det(\sigma_\epsilon^2 I) \qquad (16)$$

In an embodiment, for the determinant of the matrix X, the dictionary D is typically chosen so that it is unitary, meaning that det(D)=1. Thus, it can be seen that det(X)=det (RD)=det(R). Therefore, since log is monotonically increasing, this leads to Equation (17) below:

$$\det(\sigma_u^2 X^T H^2(x) X) = \sigma_u^{2n} \det(R)^2 \det(H^2(x)) \qquad (17)$$

Which, returning to the log det function, leads to Equation (18) below:

$$\log \det(B(x)) \geq \log(\sigma_u^{2n} \det(R)^2 \det(H^2(x)) + \sigma_\epsilon^{2n}) \geq \qquad (18)$$
$$\log \det(H^2(x)) + K = \sum_{i=1}^n \frac{x_i}{a} + K$$

In Equation (18), $K = \log(\sigma_u^{2n} \det(R)^2) + \log(\sigma_\epsilon^{2n})$. In an embodiment, an approximation for $f_2$ can be defined as $$\tilde{f}_2(x) = \sum_{i=1}^n \frac{x_i}{a}.$$

In an embodiment, moving onto $f_1$ reveals no readily actionable approximation. The inverse of B(x), which is composed of the sum of matrices, is a highly nontrivial problem. Embodiments of the present disclosure avoid gradient calculations altogether by invoking a stochastic approximation (SA) approach.

In an embodiment, if we were to start with the idea that we just wanted a near enough calculation of the gradient for use in a steepest descent technique, then it would not be unreasonable to pursue some finite difference scheme, and SA builds off this idea. In an embodiment, for SPSA, the update step of a gradient descent algorithm is modified for step size $\alpha_k$, as shown by Equation (19) below:

$$x_{k+1} = x_k - \alpha_k \tilde{g}(x) \qquad (19)$$

In Equation (19), there is a gradient approximation, $\tilde{g}$, as shown by Equation (20) below:

$$\tilde{g}(x) = \frac{1}{c_k}(f(x + c_k \Delta_k) - f(x - c_k \Delta_k)) \oslash \Delta_k \qquad (20)$$

In Equation (20), $c_k > 0$ is a small value that decreases as $k \to \infty$, $\Delta_k$ follows a symmetric ±1 Bernoulli distribution, and $\oslash$ is the element-wise division operator. Given the smoothness off and sufficient choices for $\alpha_k$ and $c_k$, we found that SPSA served as competent method for Type-II estimation with substantially fewer calculations. Note that SPSA involves only two evaluations of the loss function at each iteration.

8. Exemplary Embodiments

To gain an idea of how helpful SPSA can be and what computation effort can be expected, refer to FIG. 9. In an embodiment, the same 16×16 snippet and Radon transform were used and tried over ten trials, increasing numbers of SPSA iterations with wavelet and DCT dictionaries. Random initializations started SPSA. In every case, SPSA was not only able to decrease the value of f but also do so in a way that improves the ultimate SSIM value of the reconstructed image. Embodiments of the present disclosure using SPSA were able to replicate the sparse signal from the randomized starting point, as FIG. 6 illustrates.

To provide context for fsHBMAP, we experimented on a 32×32 piece 504 of image 202 projected with a sampling pattern containing 18 rays with 71 samples each. The result 504 obtained fsHBMAP had a SSIM of 0.78. The result 504 from fsHBMAP in accordance with an embodiment of the present disclosure outperforms competing methods with a substantially less computation time. Further, embodiments of the present disclosure using fsHBMAP are much more amenable to being applied to large scale imaging problems because, in an embodiment, no explicit gradient or Kronecker calculations are involved.

9. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An imaging system, comprising:
    a sensor configured to sense a scene from a plurality of different angles, thereby generating sensed data; and
    an image generator device in communication with the sensor, wherein the image generator device is configured to:
        generate a plurality of sensing matrices based on geometry of the angles and a waveform used to sense the scene,
        estimate a plurality of coefficients for an image based on the sensing matrices,
        estimate a non-Gaussian component of a Compound Gaussian (CG) vector based on the plurality of coefficients using a Simultaneous Perturbation Stochastic Approximation (SPSA),
        multiply columns of an effective sensing matrix with scalar components of the non-Gaussian component of the CG vector, and
        generate an image based on the CG vector.

2. The imaging system of claim 1, wherein the image generator device is further configured to:
    estimate a Gaussian component of the CG vector based on the effective sensing matrix, the non-Gaussian component, and the sensed data.

3. The imaging system of claim 2, wherein the image generator device is further configured to:
    generate the image based on the CG vector and a dictionary matrix.

4. The imaging system of claim 1, wherein the sensor is a synthetic-aperture radar (SAR).

5. The imaging system of claim 1, wherein the image generator device is configured to generate the plurality of sensing matrices using a Radon transform.

6. A method for generating an image, the method comprising:
- generating, using an image generator device, a plurality of sensing matrices based on geometry of a plurality of angles used to sense a scene and a waveform used to sense the scene;
- estimating, using the image generator device and based on the sensing matrices, a plurality of coefficients for an image;
- estimating, using the image generator device, a non-Gaussian component of a Compound Gaussian (CG) vector based on the plurality of coefficients using a Simultaneous Perturbation Stochastic Approximation (SPSA);
- multiplying columns of an effective sensing matrix with scalar components of the non-Gaussian component of the CG vector; and
- generating, using the image generator device, the image based on the CG vector.

7. The method of claim 6, further comprising:
- sensing a scene from a plurality of different angles, thereby generating sensed data.

8. The method of claim 7, further comprising:
- estimating a Gaussian component of the CG vector based on the effective sensing matrix, the non-Gaussian component, and the sensed data.

9. The method of claim 8, wherein generating the image comprises:
- generating the image based on the CG vector and a dictionary matrix.

10. The method of claim 6, wherein the sensor is a synthetic-aperture radar (SAR).

11. The method of claim 6, wherein generating the plurality of sensing matrices comprises generating the plurality of sensing matrices using a Radon transform.

12. An imaging device, comprising:
- a processor;
- a memory; and
- an image generator device configured to:
  - generate a plurality of sensing matrices based on geometry of a plurality of angles used to sense a scene and a waveform used to sense the scene,
  - estimate, based on the sensing matrices, a plurality of coefficients for an image,
  - estimate a non-Gaussian component of a Compound Gaussian (CG) vector based on the plurality of coefficients using a Simultaneous Perturbation Stochastic Approximation (SPSA),
  - multiply columns of an effective sensing matrix with scalar components of the non-Gaussian component of the CG vector, and
  - generate an image based on the CG vector.

13. The imaging device of claim 12, wherein the image generator device is further configured to:
- estimate a Gaussian component of the CG vector based on the effective sensing matrix, the non-Gaussian component, and sensed data; and
- generate the image based on the CG vector and a dictionary matrix.

14. The imaging device of claim 13, further comprising:
- a sensor configured to sense a scene from a plurality of different angles, thereby generating the sensed data.

15. The imaging device of claim 14, wherein the sensor is a synthetic-aperture radar (SAR).

16. The imaging device of claim 14, wherein the image generator device is configured to generate the plurality of sensing matrices using a Radon transform.

* * * * *